US008459914B2

(12) United States Patent
Tatina

(10) Patent No.: US 8,459,914 B2
(45) Date of Patent: Jun. 11, 2013

(54) LASHING STRAP HOOK LOAD SECURING SYSTEM

(75) Inventor: Richard A. Tatina, Countryside, IL (US)

(73) Assignee: Holland LP, Crete, IL (US)

( * ) Notice: Subject to any disclaimer, the term of this patent is extended or adjusted under 35 U.S.C. 154(b) by 11 days.

(21) Appl. No.: 13/101,229

(22) Filed: May 5, 2011

(65) Prior Publication Data

US 2012/0282057 A1    Nov. 8, 2012

(51) Int. Cl.
*B60P 7/06* (2006.01)
(52) U.S. Cl.
USPC ............................................ 410/100
(58) Field of Classification Search
USPC .............. 410/100, 104, 105, 102, 115, 116, 410/110
See application file for complete search history.

(56) References Cited

U.S. PATENT DOCUMENTS

| 5,193,955 | A  | * | 3/1993  | Chou ........................... 410/100 |
| 5,458,447 | A  | * | 10/1995 | Clason .......................... 410/100 |
| 6,195,848 | B1 | * | 3/2001  | Jackson et al. ............... 24/68 CD |
| 6,209,768 | B1 | * | 4/2001  | Boaz ............................ 224/314 |
| 6,402,446 | B1 | * | 6/2002  | Nadherny et al. ............ 410/100 |
| 6,851,902 | B2 | * | 2/2005  | Stanley .......................... 410/97 |
| 7,231,693 | B2 | * | 6/2007  | Wilcox et al. ................. 24/68 R |
| 7,296,326 | B2 | * | 11/2007 | Madachy et al. ......... 24/68 CD |
| 7,377,484 | B1 | * | 5/2008  | Williams ....................... 254/218 |
| 2010/0102175 | A1 | * | 4/2010 | Dockery et al. ............ 248/74.3 |

OTHER PUBLICATIONS

Two photographs of a prior art cord lash hook with lashing strap attached (undated).
A photograph of a prior art hook for a lash strap (undated).

\* cited by examiner

*Primary Examiner* — Glenn Dayoan
*Assistant Examiner* — Sunsurraye Westbrook
(74) *Attorney, Agent, or Firm* — Schiff Hardin LLP

(57) ABSTRACT

In a lashing strap hook load securing system for securing a load on a load platform, the load platform has first and second pockets each having an open top and bottom and an end wall at sides of the platform. A lashing strap is provided with an associated strap winch for placement over the load on the load platform. First and second lashing strap hooks are provided, each lashing strap hook having a hook portion merging into a lashing strap retaining portion. The hook portion is shaped for engagement with an upper edge of the end wall of the respective pocket and comprises an outer bridging surface having a width at least equal to a width of the lashing strap and bounded at side edges by first and second respective guide surfaces extending above the outer bridging surface. The hook retaining portion comprises first and second retaining elements spaced apart to define a slot therebetween. The second retaining element is at an end of the retaining portion and the first retaining element is inwardly of the second retaining element. The first and second retaining elements and the slot are dimensioned to receive an end of the lashing strap threaded around each of the first and second retaining elements and inserted through the slot. With the hook having its retaining portion in a longitudinally extending vertical alignment, the lashing strap passes over and onto the bridging surface to assist in retaining the hook portion on the upper edge of the pocket.

16 Claims, 5 Drawing Sheets

LASHING STRAP HOOK LOAD SECURING SYSTEM

BACKGROUND

It has been known in the prior art to use a polyester lashing strap to secure a load on a flat load platform of a railcar or a flatbed trailer by use of stake pockets positioned at opposite outer sides of the load platform. These stake pockets comprising a three-sided enclosure are typically welded to platform supports at the sides of the flatbed trailer or railcar and are aligned directly below a notch cut out in the load platform. These stake pockets have an open top and bottom and receive a hook which hooks onto a lower edge of the stake pocket. The hook has two slots through which an end of the lashing strap is threaded. The lashing strap then proceeds upwardly on the outside of the pocket to a strap winch and then up and over the load. The opposite end of the strap is threaded onto a second hook which engages with a lower edge of another stake pocket at the opposite side of the load.

If slack should occur in the lashing, such as by a shifting or settling of the load, the hook can disengage from the lower edge of the stake pocket. Also a portion of the strap may rub against a top edge of the stake pocket and cause degradation thereof, such as by abrasion. This may be caused by load shifts.

SUMMARY

It is an object to improve on the above-described prior art hook system using lashing straps to secure a load on a load platform having stake pockets.

In a lashing strap hook load securing system for securing a load on a load platform, the load platform has first and second pockets each having an open top and bottom and an end wall at sides of the platform. A lashing strap is provided with an associated strap winch for placement over the load on the load platform. First and second lashing strap hooks are provided, each lashing strap hook having a hook portion merging into a lashing strap retaining portion. The hook portion is shaped for engagement with an upper edge of the end wall of the respective pocket and comprises an outer bridging surface having a width at least equal to a width of the lashing strap and bounded at side edges by first and second respective guide surfaces extending above the outer bridging surface. The hook retaining portion comprises first and second retaining elements spaced apart to define a slot therebetween. The second retaining element is at an end of the retaining portion and the first retaining element is inwardly of the second retaining element. The first and second retaining elements and the slot are dimensioned to receive an end of the lashing strap threaded around each of the first and second retaining elements and inserted through the slot. With the hook having its retaining portion in a longitudinally extending vertical alignment, the lashing strap passes over and onto the bridging surface to assist in retaining the hook portion on the upper edge of the pocket.

DESCRIPTION OF THE PREFERRED EMBODIMENT

Figure 1:
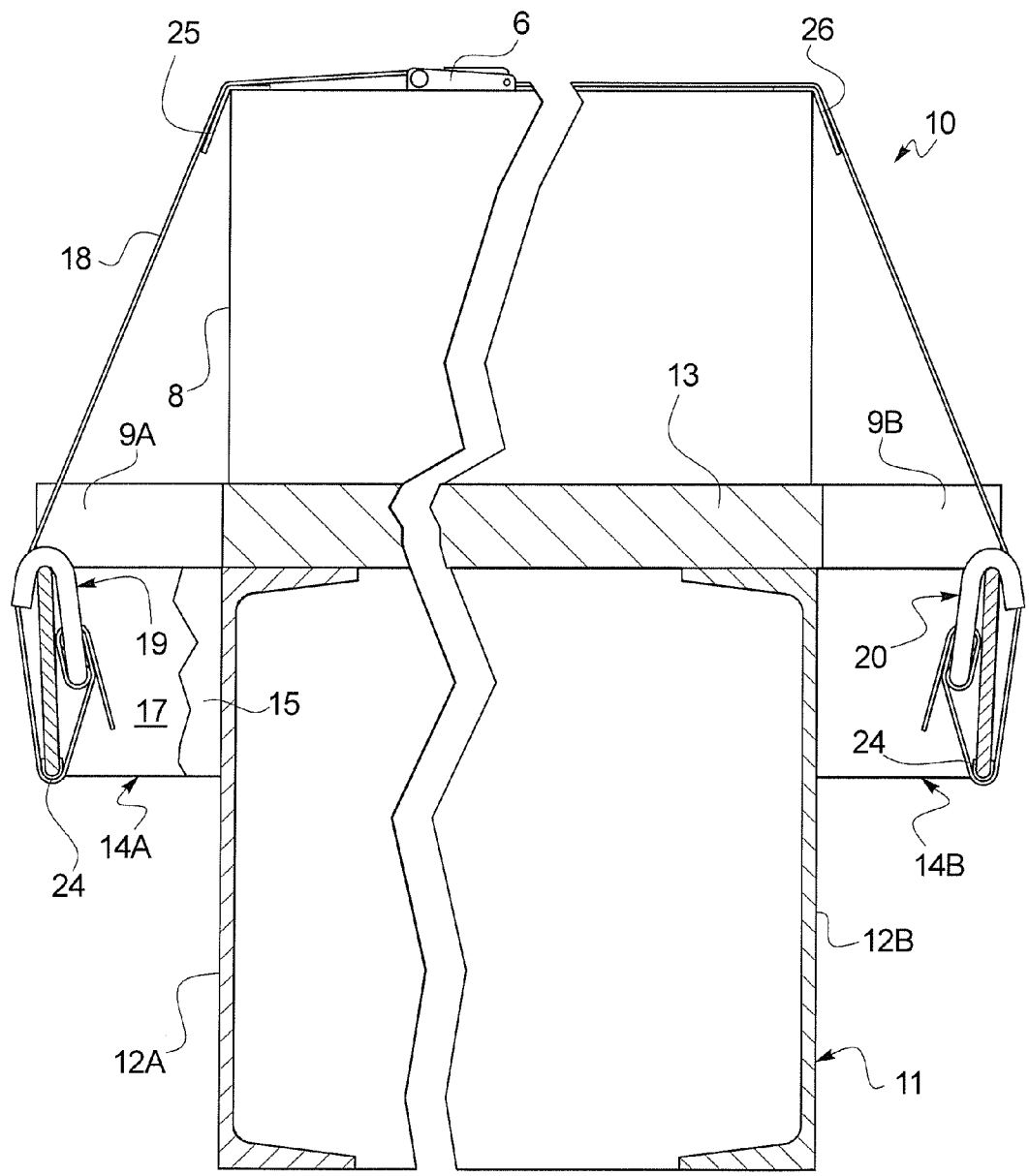
FIG. 1 is an end view of a cross-section of a lashing strap hook load securing system of the preferred embodiment as utilized on a load carrying platform.

For the purposes of promoting an understanding of the principles of the invention, reference will now be made to the preferred embodiment/best mode illustrated in the drawings and specific language will be used to describe the same. It will nevertheless be understood that no limitation of the scope of the invention is thereby intended, and such alterations and further modifications in the illustrated embodiment and such further applications of the principles of the invention as illustrated as would normally occur to one skilled in the art to which the invention relates are included.

A lashing strap hook load securing system according to the preferred embodiment is generally shown at 10 in FIG. 1. A railcar or flatbed trailer has a flat load platform structure 11 comprising first and second platform supports 12A and 12B such as in the form of a girder supporting a flat load platform 13 which may be formed of wood, steel, or other materials, for example. A respective notch 9A, 9B is cut out at each opposite side of the platform 13 in alignment with one another and respective stake pockets 14 and 15 are mounted to the respective platform supports 12A and 12B at each opposite side directly beneath the respective notches 9A, 9B.

Figure 2:
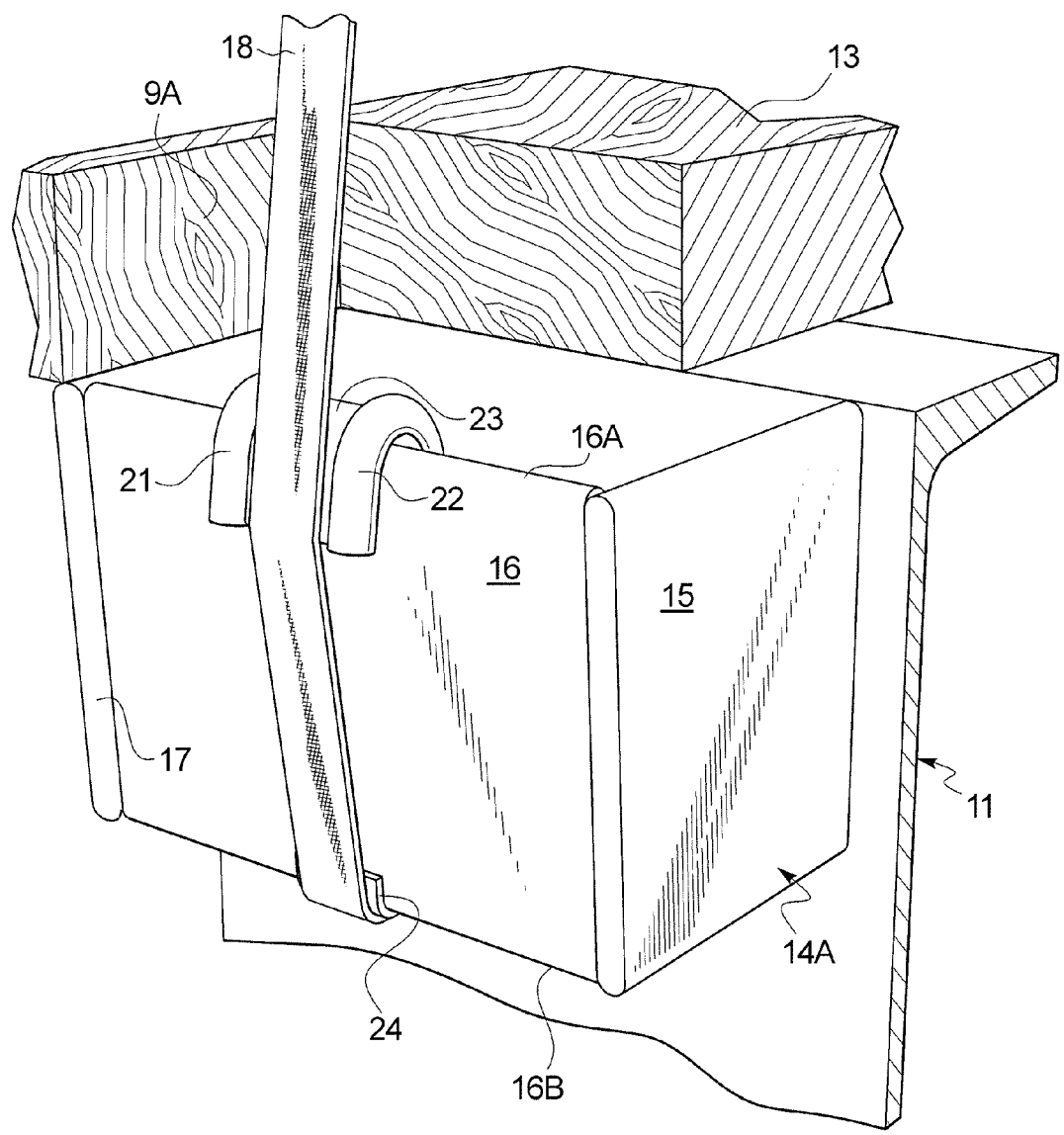
FIG. 2 is a perspective view of a lashing strap hook engaged in a stake pocket shown at the left side in FIG. 1.

The stake pocket 14, for example, is formed of opposing sidewalls 15 and 17 and an end wall 16. As can be seen in FIGS. 1 and 2, the bottom and top of the stake pocket 14 is open. End wall 16 may be slanted slightly outwardly from bottom to top.

A load 8 resting on the load platform 13 is secured by a polyester lashing strap 18 around corners of the load 8 where respective corner protectors 25 and 26 may be provided to prevent abrasion of the lashing strap 18. These corner protectors 25 and 26 may be a flat bendable material placed at the respective corners of the load where the lashing strap passes thereover.

Respective ends of the lashing strap 18 are threaded onto respective lashing strap hooks 19 and 20 which engage with respective upper edges 16A of the endwall 16 of the respective stake pockets 14 and 15. As can be seen in FIG. 1, the respective ends of the lashing strap 18 run over a smooth large radius bridging surface 23 which protects the lashing strap from abrasion at the top edge 16A of the respective stake pocket. The lashing strap then continues downwardly around a respective corner protector 24 at the bottom edge 16B of the end wall 16 of the stake pocket 14. This corner protector may be a U-shaped element clipped on to the lower edge 16B of the stake pocket 14 at the end wall 16 to prevent abrasion of the lashing strap at this location. The lashing strap then continues upwardly where it is threaded onto the lashing strap hook 19 for stake pocket 14 or 20 for stake pocket 15. A strap winch 6 is provided for tightening of the lashing strap, the lashing strap being formed of first and second portions joined at the winch, for example.

As shown in FIG. 2, the smooth, large radius bridging surface 23 transitions at opposite side edges into respective first and second rounded guide surfaces 21 and 22. These guide surfaces substantially prevent lateral shifting of the lashing strap and maintain it substantially centered on the smooth bridging surface 23. Such shifting of the lashing strap may occur as a result of load shifting during transport of the load.

Figure 3:
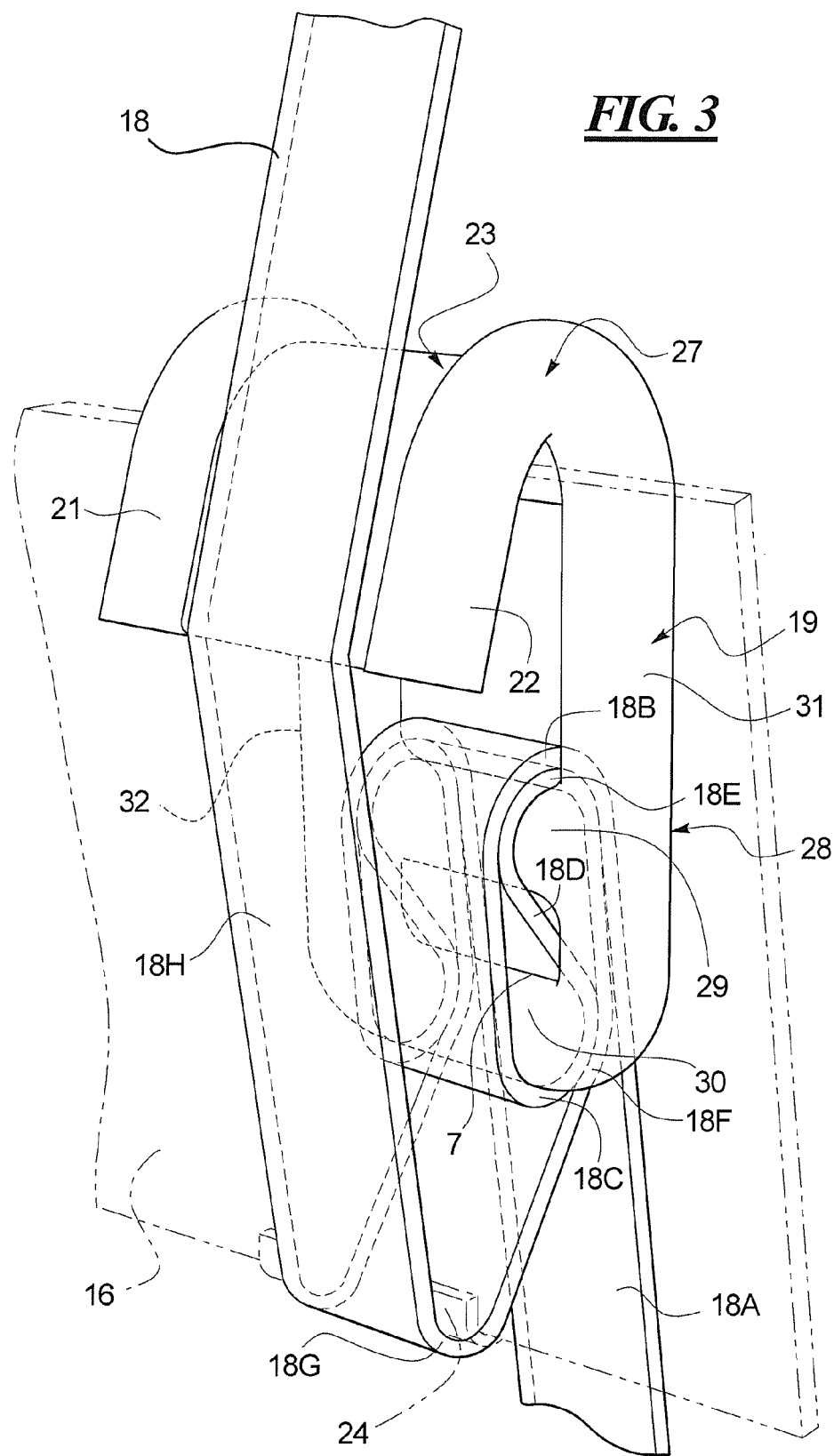
FIG. 3 is the perspective view of FIG. 2 but with the stake pocket removed for ease of viewing how the lash strap is threaded onto the lashing strap hook.
Figure 4:
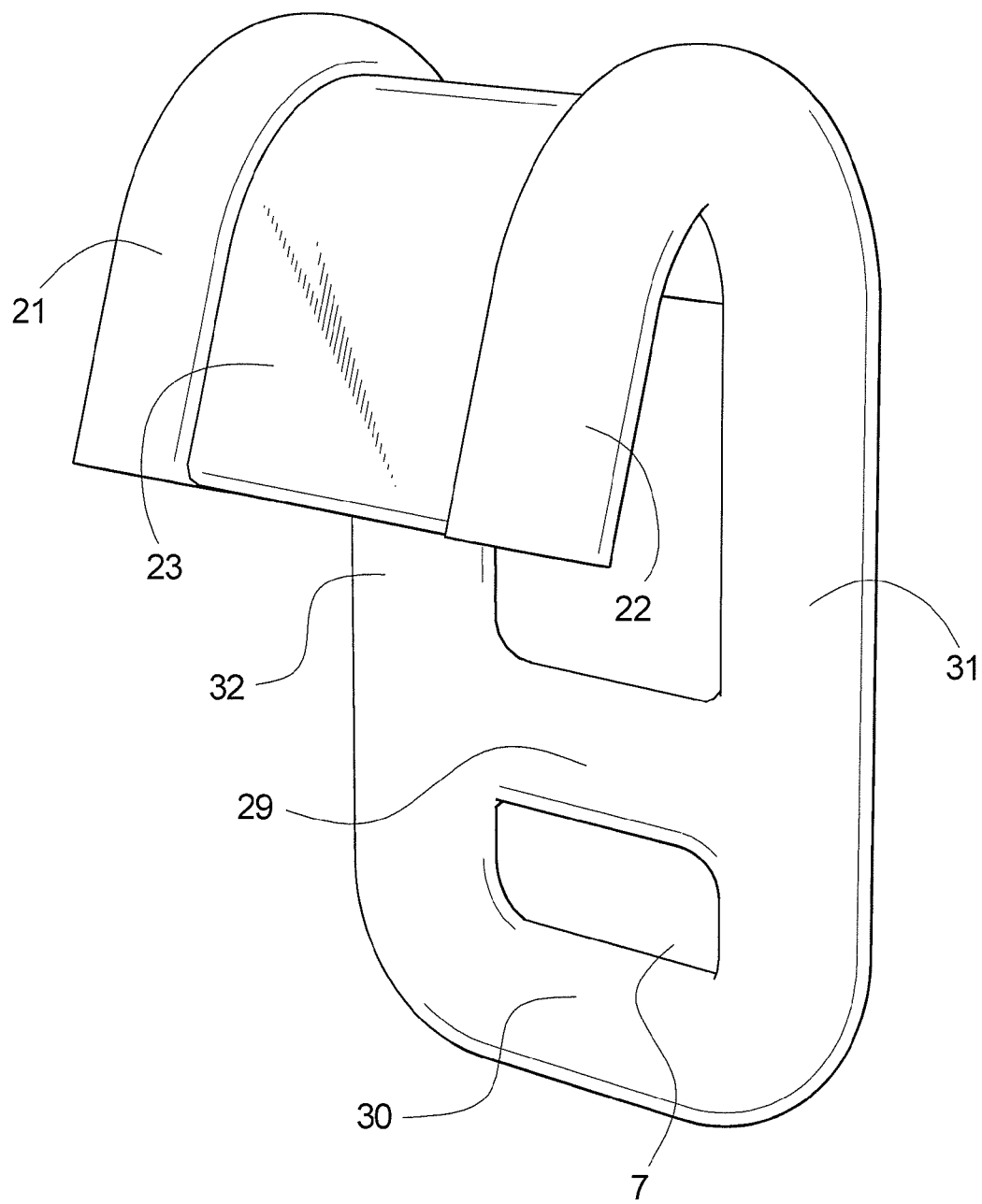
FIG. 4 is a perspective view of the lashing strap hook shown in FIG. 2 but without the stake pocket and without the lashing strap.

As shown in FIGS. 3 and 4, first and second rounded bar retaining elements 29 and 30 are provided at a lashing strap retaining portion 28 of the hook which transitions upwardly into a hook portion 27. Round side bars 31 and 32 as more clearly shown in FIG. 4 define the periphery of the retaining portion 28 and connect with the respective retaining elements 29 and 30 defining a slot 7 therebetween.

A completed threading configuration by which the end of the lashing strap 18 is attached to the hook 19 will now be described. After threading, the free end 18A hangs downwardly from the hook 19. The lashing strap passes over the first retaining element 29 at 18B, then around the bottom of the second retaining element 30 at 18C, then through slot 7 at 18D, then over and around the upper first retaining element at 18E, then partially around the bottom of the lower second retaining element 30 at 18F, then around the corner protector 24 at 18G, and then upwardly at 18H. Thus frictional engagement retains the end of the lashing strap on the retaining portion 28 of the hook 19.

Figure 5:
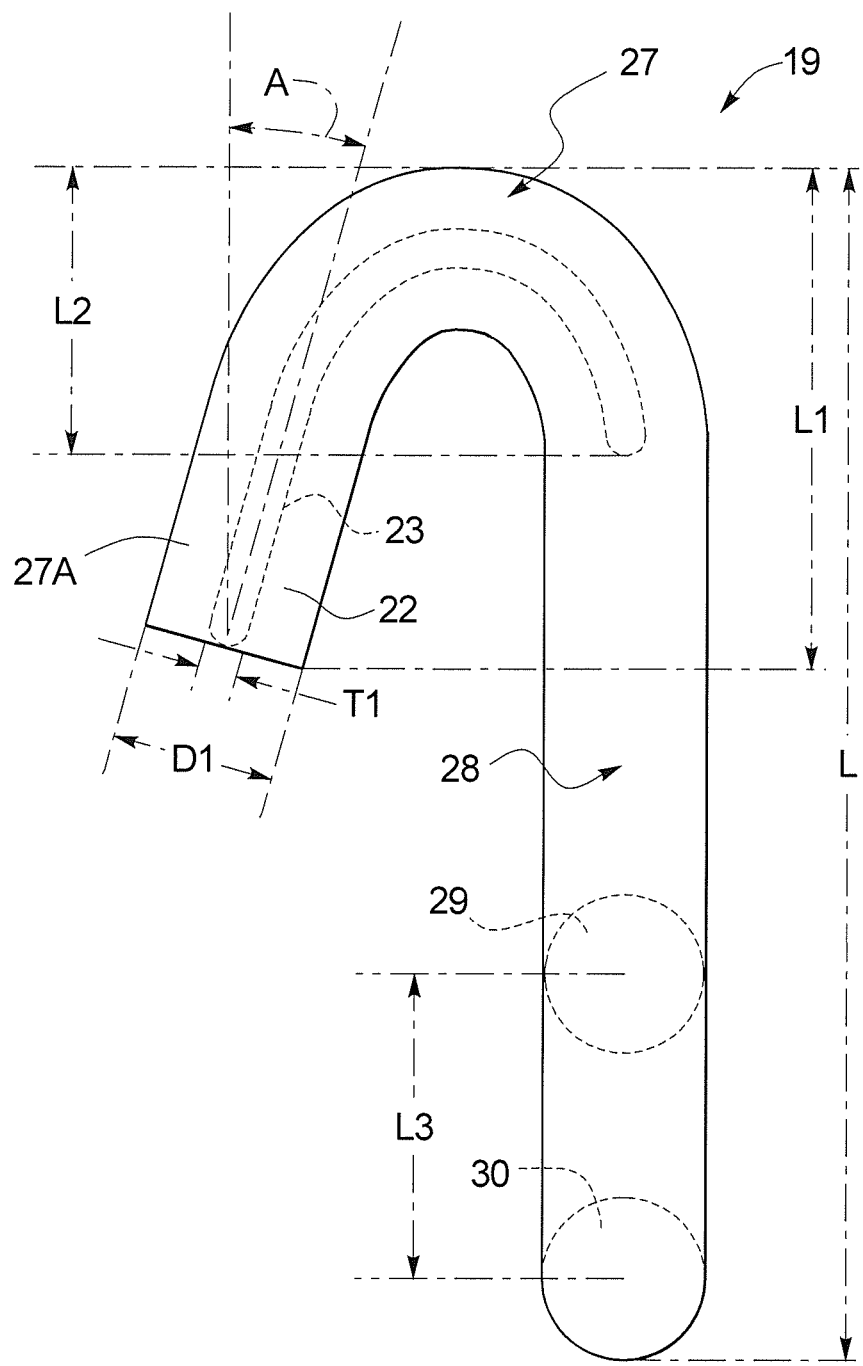
FIG. 5 is a side view of the lashing strap hook of FIG. 2 but without the stake pocket and without the lashing strap attached thereto and showing dimensional relationships of the hook and an angle of a hook position thereof.

FIG. 5 illustrates in a side view preferred dimensional relationships for the hook 19. Hook portion 27 downwardly extending leg 27A is angled with respect to vertical at an angle A preferably between 5 and 15 degrees. This leg 27A has a leg length chosen such that given the bend angle shown at A it extends at its end by a length L1 relative to a top of the hook portion 27. This length L1 may be 20 percent to 30 percent of the overall length L of the hook 19.

The bridging surface 23 terminates at the back side of the hook to form an open window. This termination point is indicated at L2 and is 15 to 25 percent of the overall length L.

A center-to-center spacing between retaining element 29 and retaining element 30 defining a size of a slot therebetween, is shown at L3 and is preferably 20 percent to 30 percent of the overall length L of the hook.

The thickness T1 of the bridging surface 23 is preferably 20 to 30 percent of a diameter D1 of the rounded guide surface 22.

With the lashing strap hook securing system of the preferred embodiment, accidental unhooking is substantially precluded since the hook portion of the hook engages the upper edge of the stake pocket so that even if the lashing strap loosens, as may occur as a result of a shifting or compression of the load, disengagement of the hook is substantially prevented. This is particularly true since the lashing strap also passes over the guide surface on the hook portion, thus reinforcing engagement with the upper edge of the stake pocket at the end wall 16.

Furthermore, abrasion of the strap is reduced or eliminated by the smooth bridging surface and displacement of the strap on the bridging surface is substantially prevented by use of the rounded guide surfaces 21 and 22 at both opposite sides of the smooth bridging surface 23.

By use of the rounded retaining elements 29 and 30, abrasion is reduced or prevented on the end of the strap while retaining adequate friction based on the spacing of the two elements with respect to one another. The threaded pattern described above for the end of the strap utilizing the slot 7 between the retaining elements 29 and 30 and the retaining elements themselves provide adequate friction to prevent release of the end of the strap from the hook.

Preferably the hook is made of metal but could conceivably be made of other materials such as hardened plastic or the like.

Also various processes for manufacturing the hook may be utilized such as forging, molding, bending, or the like.

Although the lashing strap is preferably formed of polyester, it may be formed of other appropriate materials having adequate strength for securement of the load.

Although only one lashing strap is shown, a plurality of lashing straps may be used in conjunction with a given load at spaced apart locations depending on placement of the stake pockets.

The stake pockets may have alternate shapes than the shape shown in the preferred embodiment.

Although a preferred exemplary embodiment is shown and described in detail in the drawings and in the preceding specification, it should be viewed as purely exemplary and not as limiting the invention. It is noted that only a preferred exemplary embodiment is shown and described, and all variations and modifications that presently or in the future lie within the protective scope of the invention should be protected.

I claim as my invention:

1. A lashing strap hook for securing a load on a load platform, said load platform having first and second substantially rectangular stake pockets having an open top and open bottom and an end wall and positioned at opposite sides of the load platform, and wherein a lashing strap is to be used with an associated strap winch for placement over a top of the load on the load platform, comprising:

a hook portion merging into a lashing strap retaining portion;

the hook portion being shaped for engagement with an upper edge of the end wall of the respective stake pocket and comprising a smooth bending radius outer bridging surface having a width at least equal to a width of the lashing strap to be used and bounded at side edges by first and second respective guide surfaces extending above the outer bridging surface;

said hook retaining portion comprising first and second bar retaining elements spaced apart to define a slot therebetween, the second retaining element being at an end of the retaining portion and the first retaining element being inwardly of said second retaining element, both said first and second retaining elements extending between opposite first and second side bars of the hook retaining portion, said first and second retaining elements and said slot being dimensioned and adapted to receive an end of said lashing strap to be threaded around each of said first and second retaining elements and inserted through said slot; and said bridging surface being dimensioned and adapted relative to said hook retaining portion such that with the hook having its retaining portion in a longitudinally extending vertical alignment, said lashing strap when threaded onto said retaining portion will pass over and onto said bridging surface to assist in retaining said hook portion on said end wall upper edge of said stake pocket.

2. The hook of claim 1 wherein a leg of said hook portion has a longitudinal extent defining an angle with respect to vertical which is between 5 and 15 degrees.

3. The hook of claim 1 wherein a length of an end of a leg of said hook portion up to a top of said hook is between 20 percent to 30 percent of an overall length of the hook.

4. The hook of claim 1 wherein said bridging surface terminates at said hook retaining portion at a distance from a top of the hook which is 15 to 25 percent of an overall length of the hook.

5. The hook of claim 1 wherein said bar retaining elements are round and wherein a spacing between respective center lines of a longitudinal extent of each of said respective first and second retaining elements is between 20 to 30 percent of an overall length of the hook.

6. The hook of claim 1 where said guide surfaces are round and wherein a thickness of the bridging surface is 20 to 30 percent of a diameter of the round guide surfaces.

7. The hook of claim 1 wherein the bridge surface terminates at a back side of the hook to form an open window, a termination point relative to a top of the hook being 15 to 25 percent of an overall length of the hook.

8. A load transporting and securing system for transporting and securing a load, comprising:
   a load platform, said load platform having first and second pockets having an open top, an open bottom and an end wall and positioned at opposite sides of the load platform;
   a lashing strap with an associated strap winch placed over a top of the load on the load platform;
   first and second lashing strap hooks, each lashing strap hook having a hook portion merging into a lashing strap retaining portion;
   the hook portion being shaped for engagement with an upper edge of the end wall of the respective pocket and comprising a smooth bending radius outer bridging surface having a width at least equal to a width of the lashing strap and bounded at side edges by first and second respective guide surfaces extending above the outer bridging surface;
   said hook retaining portion comprising first and second substantially round bar retaining elements spaced apart to define a slot therebetween, the first retaining element being inwardly of the second retaining element, both said first and second retaining elements extending between opposite first and second sidebars of the hook retaining portion, the first and second retaining elements and said slot being dimensioned and adapted to receive and receiving an end of said lashing strap threaded around each of said first and second retaining elements and inserted through said slot; and
   said bridging surface being dimensioned and adapted relative to said hook retaining portion such that with the hook having its retaining portion in a longitudinally extending vertical alignment, said lashing strap threaded onto said retaining portion passes over and is in contact with said bridging surface to assist in retaining said hook portion on said upper edge of said pocket.

9. The system of claim 8 wherein said end wall of each of said stake pockets is slanted outwardly from bottom to top.

10. The system of claim 8 wherein said load platform comprises a rail car load platform.

11. The system of claim 10 wherein notches are cut out on the load platform directly above the first and second stake pockets.

12. The system of claim 8 wherein the load platform is substantially flat.

13. The system of claim 8 wherein the load platform comprises a flatbed truck platform.

14. The system of claim 13 wherein notches are cut out in the flatbed load platform directly above the stake pockets.

15. The system of claim 8 wherein a U-shaped corner protector element is clipped on a lower edge of the endwall of the respective stake pocket.

16. A lashing strap hook for securing a load on a load platform, said load platform having first and second substantially rectangular stake pockets having an open top, an open bottom, and formed of opposite sidewalls and an end wall and positioned at opposite sides of the load platform, and wherein a lashing strap with an associated strap winch is to be employed for placement over a top of the load on the load platform utilizing first and second of said lashing strap hooks, comprising:
   a hook portion merging into a lashing strap retaining portion;
   the hook portion being shaped for and to be in engagement with an upper edge of the end wall of the respective stake pocket and comprising a smooth bending radius outer bridging surface having a width at least equal to a width of the lashing strap to be used and bounded at side edges by first and second respective substantially rounded guide surfaces extending above the outer bridging surface;
   said hook retaining portion comprising first and second substantially round bar retaining element spaced apart to define a slope therebetween, the second retaining element being at an end of the retaining portion and the first retaining element being inwardly of said second retaining element, both said first and second retaining elements extending between opposite first and second substantially rounded side bars of the hook retaining portion, said first and second retaining elements and said slot being dimensioned and adapted to receive an end of said lashing strap to be threaded around each of said first and second retaining elements and to be inserted through said slot; and
   said bridging surface being dimensioned relative to said hook retaining portion such that with the hook having its retaining portion in a longitudinally extending vertical alignment when hooked on said upper edge of said end wall of said stake pocket and when said lashing strap is threaded onto said retaining portion and passes over and onto said bridging surface it assists in retention of said hook portion on said end wall upper edge of said stake pocket.

* * * * *